United States Patent [19]

Albrecht

[11] Patent Number: 5,338,075

[45] Date of Patent: Aug. 16, 1994

[54] COMBINATION FLUID FLOW PORTS

[76] Inventor: David E. Albrecht, 1383 Granary Rd., Blue Bell, Pa. 19422

[21] Appl. No.: 73,926

[22] Filed: Jun. 3, 1993

[51] Int. Cl.$^5$ ............................................. F16L 23/00
[52] U.S. Cl. .................................. 285/368; 285/211; 285/379; 285/12
[58] Field of Search ................... 285/12, 39, 204, 205, 285/206, 207, 208, 211, 212, 363, 368, 379

[56] References Cited

U.S. PATENT DOCUMENTS

| | | | |
|---|---|---|---|
| 1,267,143 | 5/1918 | Sullivan | 285/211 |
| 2,826,436 | 3/1958 | Hupp et al. | 285/211 |
| 3,001,804 | 9/1961 | Tomlinson et al. | 285/368 |
| 3,188,119 | 6/1965 | Miller | 285/211 |
| 3,549,179 | 12/1970 | Cox | 285/368 |
| 4,023,836 | 5/1977 | Applehans | 285/368 |
| 4,426,103 | 1/1984 | Sundholm | 285/368 |
| 4,647,084 | 3/1987 | Hagin et al. | 285/363 |
| 5,000,488 | 3/1991 | Albrecht | 285/12 |
| 5,174,612 | 12/1992 | Schnell | 285/208 |

FOREIGN PATENT DOCUMENTS

556670 4/1958 Canada ............................. 285/368

Primary Examiner—Eric K. Nicholson
Attorney, Agent, or Firm—Frank A. Follmer

[57] ABSTRACT

A combination fluid flow port which can be used as both a full size threaded port and a full size flange port is provided with an annular ring constructed and arranged to fit closely within a counterbore in the end of a threaded hole in the port to provide a face aligned with and extending radially inwardly from the mating face of the port body for use in enclosing the O-ring seal of a flange type male half connected to the port.

11 Claims, 6 Drawing Sheets

COMBINATION FLUID FLOW PORTS

BACKGROUND AND SUMMARY OF THE INVENTION

Fluid flow components are provided with ports to permit interconnecting one port to another to form a fluid flow system that will meet a specific requirement. These ports are generally of two types, namely, an internally threaded port or a flange port. Ports are most universally considered to be the female portion of the connection.

There are numerous internally threaded and flange port standards employed around the world, such as the SAE standard used in the United States. However, almost all of these standards have their origin as pipe connections and they are used to set forth the size requirements for connecting a pipe to a fluid flow component and/or for connecting two pipes or two fluid flow components together.

Flange ports can have a significant advantage over their internally threaded port counterparts if their male fluid flow connection portion is a flush connection to the female flange port. Currently, one of the preferred flange connections employs an O-ring that, when assembled, is totally captive in a groove on the sealing face of the flange. This ensures a positive face seal over all pressure ranges, including vacuum conditions. The flat face seal feature found in this and many other flange port systems permits one to slip a component in and out without disturbing the adjacent piping. Stress-free plumbing alignment is also much easier since it is unnecessary to spring the pipeline during make-up or take-out.

It is not uncommon to find that some fluid flow components are supplied with either a flange port or an internally threaded port. In many cases, a component will cost significantly more when it is supplied with a flange port. Although a component may be available with either a flange port or an internally threaded port, it is more costly for a supplier to carry twice the inventory for the same component function. At the present time, in most cases, the manufacturer provides both a threaded port and a flange port, i.e., two different components, for a particular size in order to ensure that the O-ring of the flange port will be maintained in a captive condition to ensure a positive face seal. In some cases, the manufacturer provides a threaded port of a smaller size than the flange port so that the O-ring on the face of the cooperating flange head of the male half of the connection is maintained in a captive condition.

It is the general object of the invention to provide a combination fluid flow port which can be used as both a full size threaded port and a full size flange port. To this end, the invention teaches how threaded ports can be modified to permit the use of either flange or threaded connectors in the plumbing of a component into a fluid flow system. This is achieved in a manner that permits a threaded port to be adapted in a simple manner when connected to a flange or flange port connection and such that a size-on-size connection can be made. In other words, whether the port is connected to an externally threaded male half or with a flange type male half, a full size port for said male half is utilized. Thus, there is no need to use two ports, with the threaded port being of a smaller size than the flange port, as is done on the prior art.

Briefly stated, the combination fluid flow port in accordance with the invention is adapted for use in a fluid flow connection of the type having a male half including a flanged head having a sealing face provided with an O-ring received in a groove therein and a flange clamp for securing the flanged head in sealing contact with the mating face of a port to which said male half is connected. The combination port in accordance with the invention comprises a body providing a mating face and having a hole extending inwardly from said mating face of said port body, said hole having a counterbore or end hole portion formed at the outermost end thereof adjacent the mating face of the port body and further including an annular ring constructed and arranged to fit closely within the counterbore and provide a face aligned with and extending radially inwardly from the mating face of the port body. The inner diameter of the annular ring is less than the inner diameter of the groove receiving the O-ring of the cooperating flanged head of the fluid flow connection whereby said O-ring is held captive by a mating face of said port in the connected position of the male half and said port. The hole in the port body is threaded in the portion thereof extending inwardly from said counterbore so as to receive a threaded male member.

DETAILED DESCRIPTION OF THE PREFERRED EMBODIMENTS

Figures 1, 2, 3:
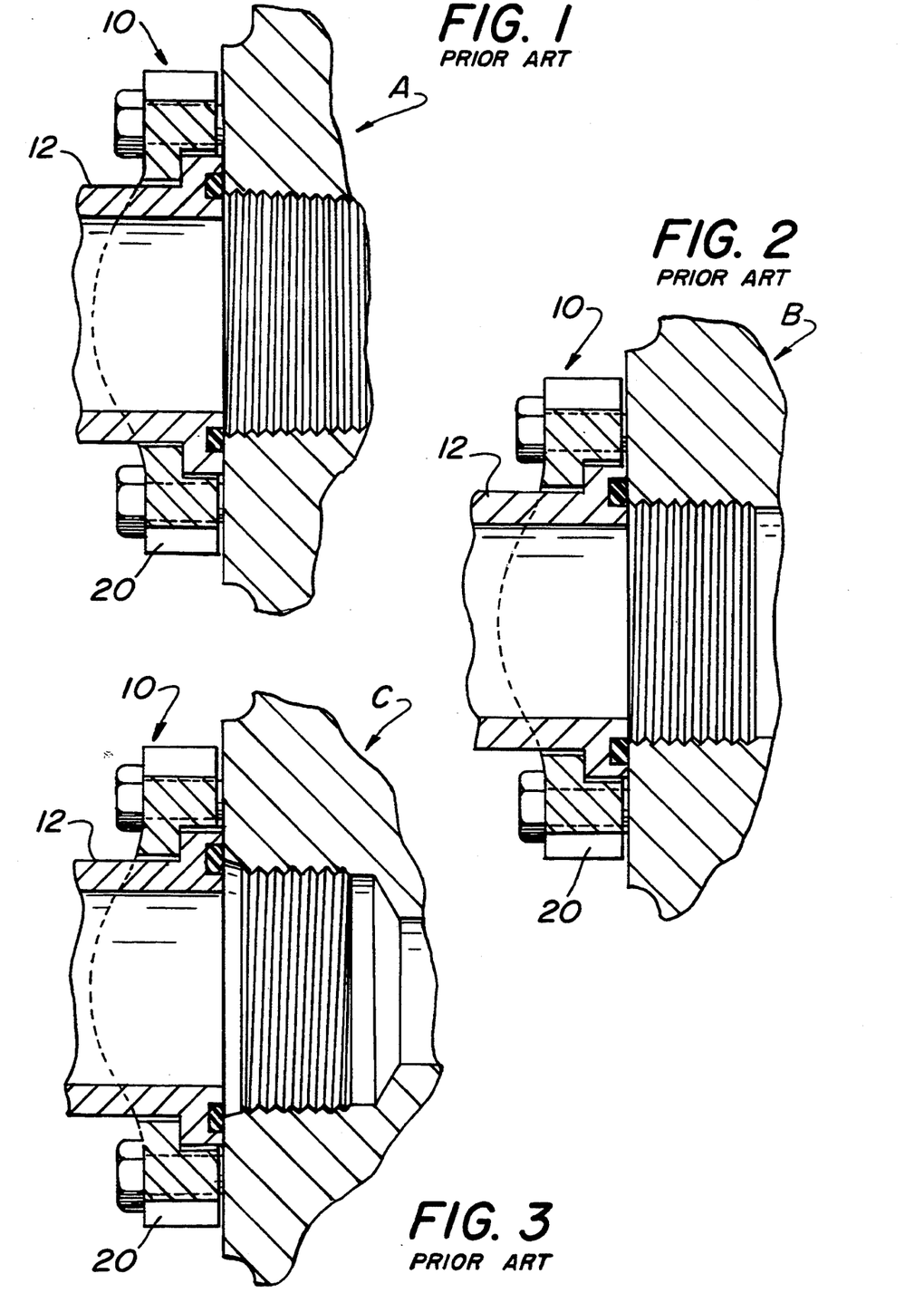
FIGS. 1, 2 and 3 are sectional views of conventional types of ports in use today.

FIGS. 1, 2, and 3 illustrate the three categories of threaded ports in use today around the world. FIG. 1 shows a port A of the tapered thread type, wherein there is no separate seal, the sealing being achieved on the two mating threaded parts. FIG. 2 shows a port B of the straight thread type wherein the sealing is achieved outside of the thread lead-in area at a suitable place. FIG. 3 shows a port C of the straight thread type wherein the seal is provided in the thread lead-in area by the use of a tapered counterbore, such as shown and described in SAE standards J1926 for straight thread ports.

FIGS. 1, 2, and 3 also illustrate how a 1-½ inch SAE four bolt flange head (in accordance with SAE standard F518) would line up with the three threaded ports shown therein. In each case, the male half 10 and the ports A, B, and C are shown in a full size-on-size configuration whereby the O-ring seal is not totally captive as intended in the SAE specification. This makes the O-ring seal subject to failure under vacuum conditions in each of the fluid flow connections shown in FIGS. 1, 2, and 3. In addition, the O-ring seal would be exposed to, and possibly damaged by, the sharp exposed threaded port surfaces. More specifically, as is apparent from a consideration of FIGS. 1, 2, and 3, under vacuum, the O-ring seal can extrude out of its normal position and may be cut by the adjacent thread, which has a helical pitch to it on its sharp exposed end. Thus, the use of a full size-on-size connections of the flanged male portion and the flanged port would result in a structure that could become damaged during use and not function properly.

Figure 4:
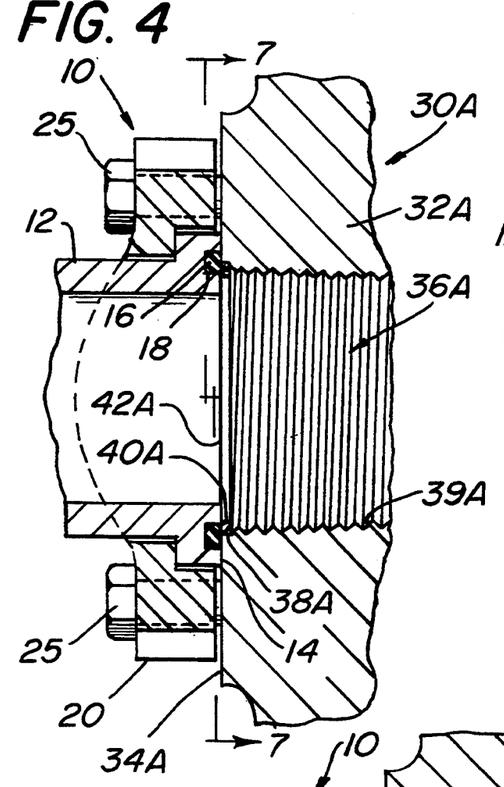
FIGS. 4, 5 and 6 are sectional views of three combination fluid flow ports in accordance with the invention of the types shown in FIGS. 1, 2 and 3, respectively.
Figure 5:
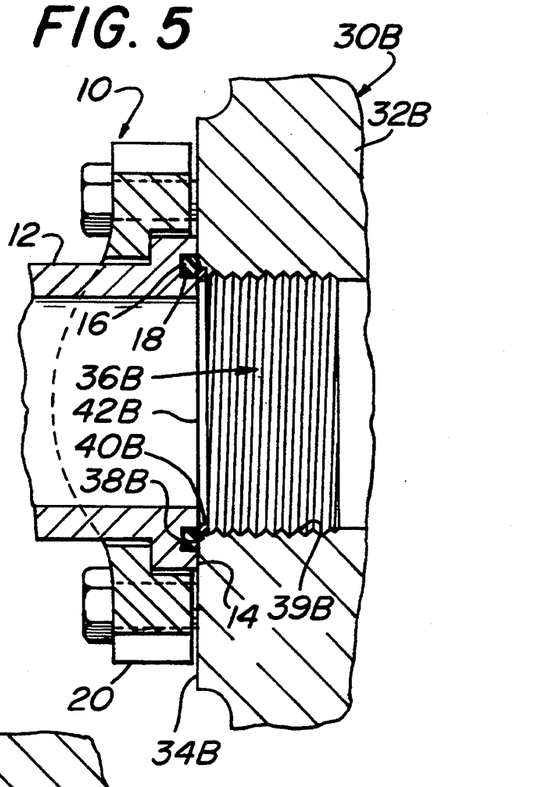
Figure 6:
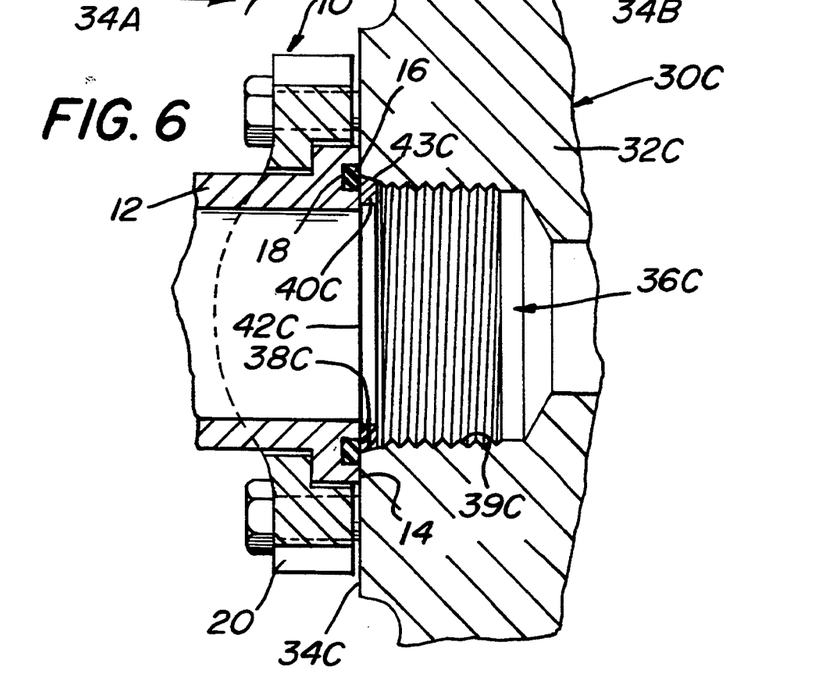

FIGS. 4, 5 and 6 illustrate combination fluid flow ports in accordance with the invention, corresponding respectively to the ports A, B and C shown in FIGS. 1, 2 and 3. The ports shown in FIGS. 4, 5 and 6 are provided with a closely fitted or pressed ring which allows the use of a combination full size flange/thread ported component to be successfully employed. By this construction, with the ring installed, the O-ring seal becomes captive in the assembly whereby seal failure is prevented.

In FIG. 4 there is shown a fluid flow connection of the type comprising a male half 10 including a flanged head 12 having a sealing face 14 provided with an O-ring seal 16 received in an annular groove 18 in face 14. Male half 10 also includes a flange clamp 20 for securing the flanged head 12 in sealing contact with the mating face of a port 30A to which the male half 10 is connected in the forming of a fluid flow connection. To this end, flange clamp 20 is secured to the body 32A of port 30A by a standard four bolt connection comprising four bolts 25 that extend through holes in flange clamp 20 to threadedly engage tapped holes in the port body 32A. The port body 32A provides a mating face 34A and has a bore or hole 36A extending inwardly from the mating face 34A. The hole 36A has an end hole portion or counterbore 38A formed at its outermost end adjacent the mating face 34A of the port body 32A. The port 30A also includes a flat annular ring 40A constructed and arranged to fit closely within the counterbore 38A, as by a close fit or a press fit. The annular ring 40A provides a face 42A aligned with, and extending radially inwardly from, the mating face 34A of the port body 32A. The inner diameter of ring 40A is less than the inner diameter of the groove 18 receiving the O-ring seal 16 of the cooperating flanged head 12 whereby the O-ring seal 16 is held captive, i.e., O-ring seal 16 is enclosed with a flat face by the mating face of the port 30A (provided by faces 34A and 42A) in the connected position of the male half 10 and the port 30A, as shown in FIG. 4. The hole 36A in the port body 32A is provided with the conventional tapered threaded portion 39A extending inwardly from the counterbore 38A, which threaded portion 39A is adapted to be threadedly engaged with a threaded male half 10' as shown in FIG. 8.

Figures 7, 8, 9:
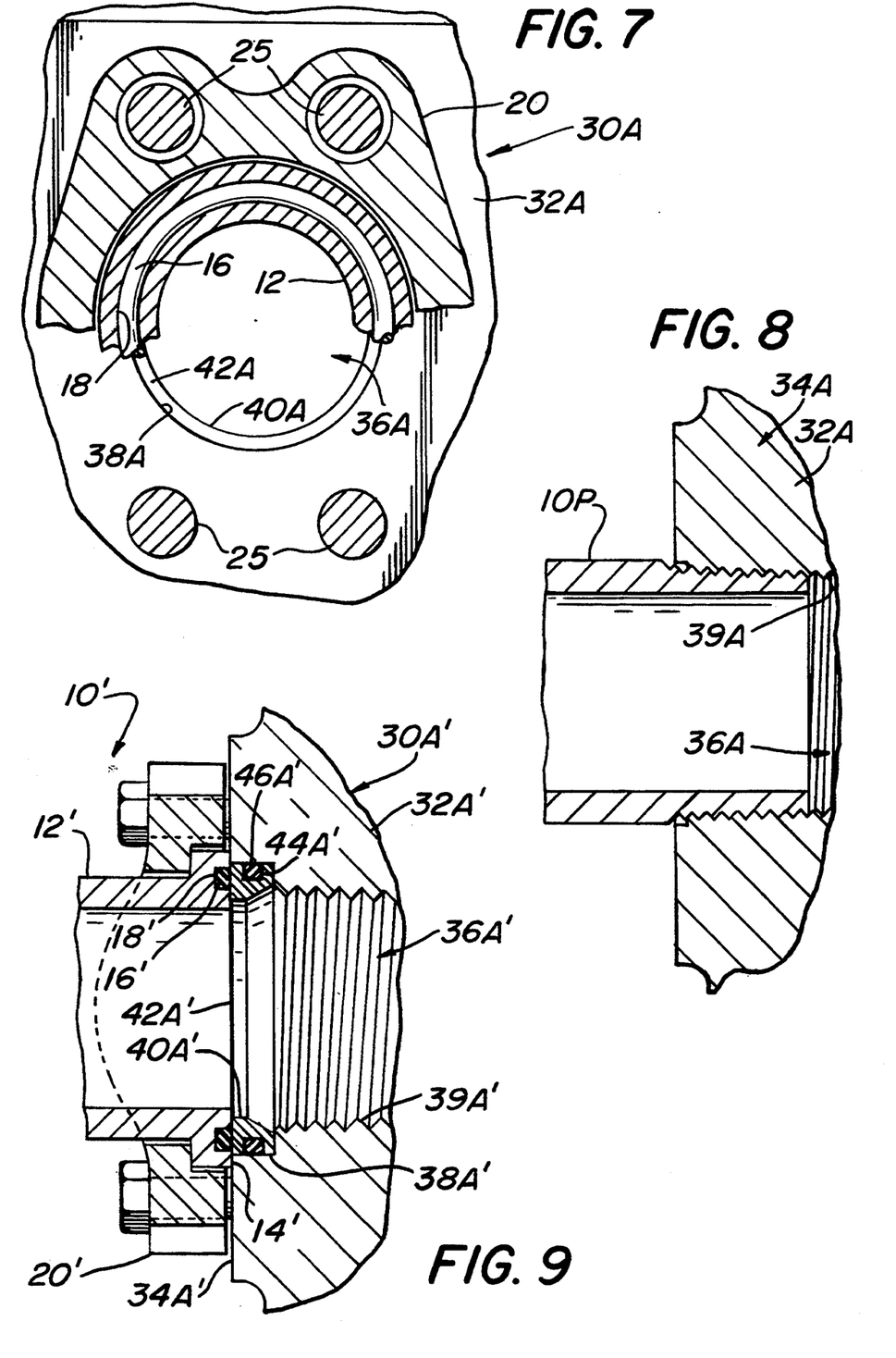
FIG. 7 is a sectional view taken on line 7—7 of FIG. 4.
FIG. 8 is a sectional view of the combination fluid flow port shown in FIG. 4 adapted for use as a threaded port.
FIGS. 9, 10 and 11 are sectional views of combination fluid flow ports in accordance with the invention of the types shown in FIGS. 4, 5 and 6, respectively.

As is shown in FIGS. 4 and 8, when the combination flow port 30A in accordance with the invention is to be connected to a threaded connector, like pipe 10P, the annular ring 40A is not installed, and when the port 30A is to be connected to a flange connector, like male half 10, the annular ring 40A is assembled into the position shown in FIG. 4 either by a press fit or a closely fitted construction. Accordingly, it is evident that the adaptation of the threaded port shown in FIG. 8 to the flange port shown in FIG. 4 can be achieved very simply.

FIG. 5 illustrates how a port of the type shown in FIG. 2 comprising a straight threaded hole is constructed to provide a combination fluid flow port in accordance with the invention. Since the port construction employed in FIG. 5 is essentially the same as that shown in FIG. 4, corresponding parts have been given the same reference numerals with the letter B used.

In FIG. 5 there is shown a fluid flow connection of the type comprising a male half 10 including a flanged head 12 having a sealing face 14 provided with an O-ring seal 16 received in an annular groove 18 in face 14 and a flange clamp 20 for securing the flanged head 12 in sealing contact with the mating face of a port 30B to which the male half 10 is connected (by a standard four bolt connection) in the forming of a fluid flow connection. The port body 32B provides a mating face 34B and has a hole 36B extending inwardly from the mating face 34B. The hole 36B has an end hole portion or counterbore 38B formed at its outermost end adjacent the mating face 34B of the port body 32B. The port 30B also includes a flat annular ring 40B constructed and arranged to fit closely within the counterbore 38B, as by a close fit or a press fit. The annular ring 40B provides a face 42B aligned with, and extending radially inwardly from, the mating face 34B of the port body 32B. The inner diameter of the ring 40B is less than the inner diameter of the groove 18 receiving the O-ring seal 16 of the cooperating flanged head 12 whereby the O-ring seal 16 is held captive, i.e., it is enclosed with a flat face, by the mating face of the port 30B (provided by faces 34B and 42B) in the connected position of the male half 10 and the port 30B as shown in FIG. 5. The hole 36B in the port body 32B is provided with the conventional straight threaded portion 39B extending inwardly from the counterbore 38B, which threaded portion 39C is adapted to be threadedly engaged with a threaded male half, in which case the annular ring 40B is not installed.

FIG. 6 illustrates how the prior art port shown in FIG. 3 involving a straight threaded hole having a tapered counterbore at its outer end is constructed to provide a combination fluid flow port in accordance with the invention. Since the embodiment shown in FIG. 6 is essentially the same as that shown in FIG. 4, corresponding parts have been given the same reference numerals with the letter C used.

In FIG. 6 there is shown a fluid flow connection of the type comprising a male half 10 including a flanged head 12 having a sealing face 14 provided with an O-ring seal 16 received in an annular groove 18 in face 14 and a flange clamp 20 for securing the flanged head 12 in sealing contact with the mating face of a port 30C to which the male half 10 is connected (by a standard four bolt connection) in the forming of a fluid flow connection. The port body 32C provides a mating face 34C and has a hole 36C extending inwardly from the mating face 34C. The hole 36C has an end hole portion or counterbore 38C having a tapered outer wall and formed at the outermost end of hole 36C adjacent the mating face 34C of the port body 32C. The port 30C also includes a flat annular ring 40C constructed and arranged to fit closely within the counterbore 38C, as by a close fit or a press fit. The annular ring 40C provides a face 42C aligned with, and extending radially inwardly from, the mating face 34C of the port body 32C and a tapered outer wall 43C conforming to the outer tapered wall of counterbore 38C. The inner diameter of the ring 40C is less than the inner diameter of the groove 18 receiving the O-ring seal 16 of the cooperating flanged head 12 whereby the O-ring seal 16 is held captive, i.e., it is enclosed with a flat face, by the mating face of the port 30C (provided by faces 34C and 42C) in the connected position of the male half 10 and the port 30C as shown in FIG. 6. The hole 36C in the port body 32C is provided with the conventional straight threaded portion 39C extending inwardly from the tapered counterbore 38C, which threaded portion 39C is adapted to be threadedly engaged with a threaded male half, in which case the annular ring 40C is not installed.

It will be apparent that the combination flow port of the invention can be made by modifying an internally threaded fluid flow port so that the standard thread forms (i.e., the three forms shown in FIGS. 1, 2 and 3) are recessed in a counterbored port, in a configuration as illustrated in FIGS. 4, 5 and 6. In this construction the outer diameter of the counterbore is at least equal to the outside diameter of the thread so as to ensure that when a closely fitted or pressed in ring is placed in the counterbore, there will be no thread surfaces exposed which could come into contact with, and possibly damage, the mating seal.

Furthermore, in the construction in accordance with the invention the ring should also be sized so that when it is installed into the counterbore, the front face of the counterbore and the front face of the ring are in alignment, as is discussed above with respect to FIGS. 4, 5 and 6.

In some applications, the counterbore formed in the combination port of the invention will have an outside diameter that is greater than the outside diameter of the mating seal in the male half of the connection. In this case, it is necessary to seal the outside diameter of the closely fitted or pressed-in annular ring that is installed. Further, depending on the application, this sealing may be accomplished by using a sealing compound on the ring and/or making the ring thicker and machining a groove for a seal to be placed on the outside diameter of the ring.

Figures 10, 11, 12:
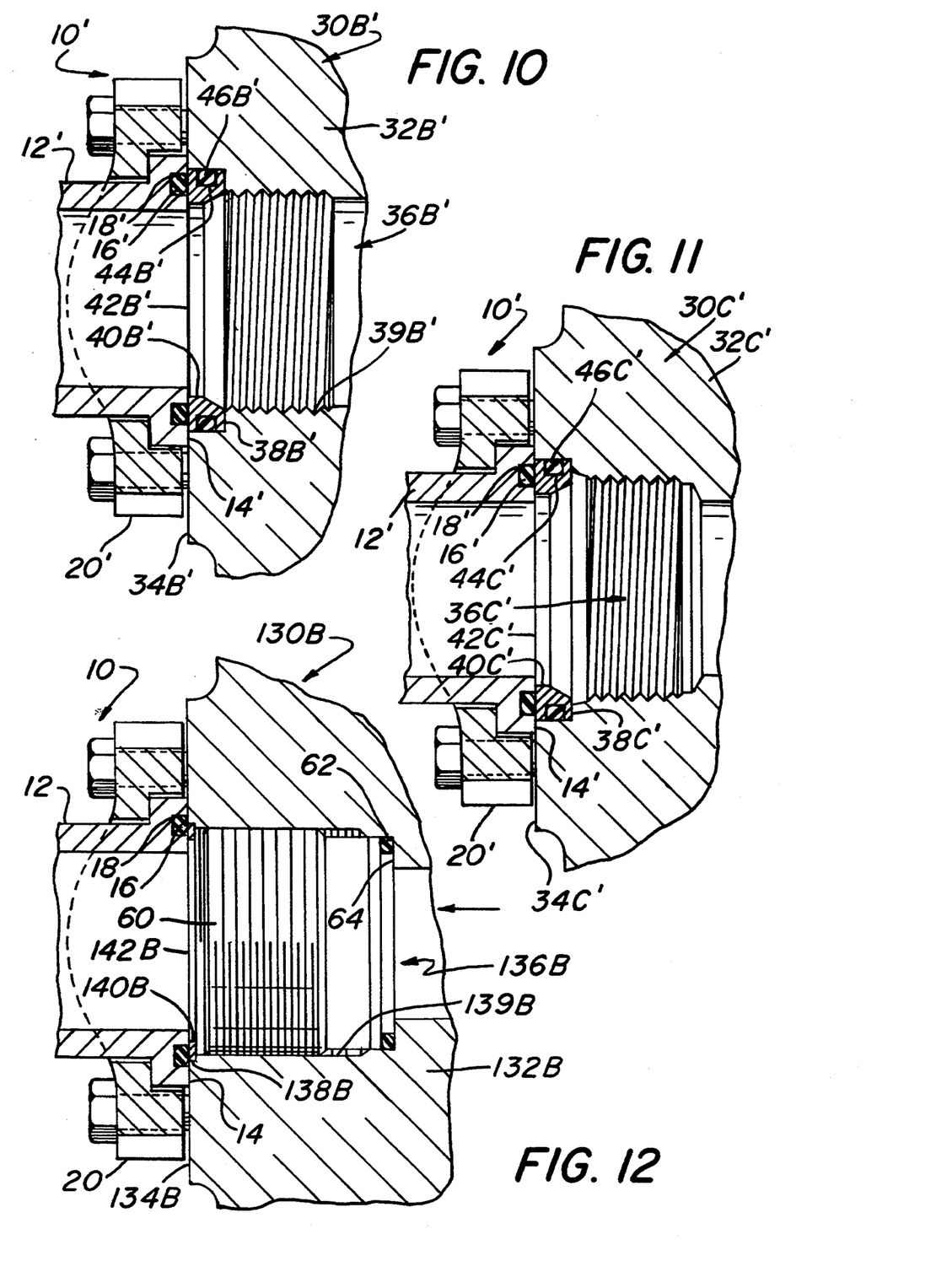
FIGS. 12, 13, 14, 15 and 16 are sectional views of combination fluid flow ports in accordance with the invention adapted to contain a fluid flow component internally therein.

FIGS. 9, 10 and 11 illustrate the use of a thick ring construction for the above-discussed applications to provide a combination fluid flow port in accordance with the invention. FIGS. 9, 10 and 11 show combination ports of this type for use with the three thread forms shown in FIGS. 4, 5 and 6, respectively, wherefore common parts have been indicated by corresponding reference numerals with primes added.

In FIG. 9 there is shown a fluid flow connection of the type comprising a male half 10' including a flanged head 12' having a sealing face 14' provided with an O-ring seal 16' received in an annular groove 18' in face 14'. Male half 10' also includes a flange clamp 20' for securing flanged head 12' in sealing contact with the mating face of a combination port 30A' to which the male half is connected in the forming of a fluid flow connection by means of a standard four bolt connection as discussed above. The port body 32A' provides a mating face 34A' and has a hole 36A' extending inwardly from the mating face 34A'. Hole 36A' has an end hole portion or counterbore 38A' formed at its outermost end adjacent mating face 34A'. The port 30A' includes a relatively thick annular ring 40A' constructed and arranged to fit closely within counterbore 38A', as by a close fit or a press fit. Annular ring 40A' provides a face 42A' aligned with and extending radially inwardly from the mating face 34A' of port body 30A'. The inner diameter of ring 40A' is less than the inner diameter of the groove 18' receiving the O-ring 16' of the cooperating flanged head 12'. The parts are constructed and arranged so that the face 42A' is arranged to cooperate with the flanged head 12 to make the O-ring seal 16' to be held captive, i.e., O-ring 16' is enclosed with a flat face by the mating face 42A' of the ring 40A' of port 30A' in the connected position of the male half 10' and the port 30A', as shown in FIG. 9. The hole 36A' in port body 32A' is provided with the conventional tapered threaded portion 39A' extending inwardly from counterbore 30A', which threaded portion 39A' is adapted to be threadedly engaged with a threaded male half in the alternate use of the combination port 30A' as discussed above. Annular ring 40A' is provided with a groove 44A' in the outer peripheral wall thereof and an O-ring seal 46A' received in groove 44A' for providing a seal between the outer wall of ring 40A' and the port body 32A' as shown in FIG. 9.

FIG. 10 illustrates how a port of the type shown in FIG. 9 is constructed for a straight threaded hole (per FIG. 5). Since the port construction employed in FIG. 10 is essentially the same as that shown in FIG. 9 corresponding parts have been given the same reference numerals with the letter B used. As shown in FIG. 10, there is employed an annular ring 40B' constructed and arranged and contained in a counterbore 38B' in a manner to provide a face seal which extends across the O-ring seal 18' in the male half 10' in the same manner as discussed above. Male half 10' also includes a flange clamp 20' for securing flanged head 12' in sealing contact with the mating face of a combination port 30B' to which the male half is connected in the forming of a fluid flow connection by means of a standard four bolt connection as discussed above. The port body 32B' provides a mating face 34B' and has a hole 36B' extending inwardly from the mating face 34B'. Hole 36B' has an end hole portion or counterbore 38B' formed at its outermost end adjacent mating face 34B'. The port 30B' includes a relatively thick annular ring 40B' constructed and arranged to fit closely within counterbore 38B', as by a close fit or a press fit. Annular ring 40B' provides a face 42B' aligned with and extending radially inwardly from the mating face 34B' of port body 30B'. The inner diameter of ring 40B' is less than the inner diameter of the groove 18' receiving the O-ring 16' of the cooperating flanged head 12'. The parts are constructed and arranged so that the face 42B' is arranged to cooperate with the flanged head 12 to make the O-ring seal 16' to be held captive, i.e., O-ring 16' is enclosed with a flat face by the mating face 42B' of the ring 40B' of port 30B' in the connected position of the male half 10' and the port 30B', as shown in FIG. 9. The hole 36B' in port body 32B' is provided with the conventional tapered threaded portion 39B' extending inwardly from counterbore 30B', which threaded portion 39B' is adapted to be threadedly engaged with a threaded male half in the alternate use of the combination port 30B' as discussed above. Annular ring 40B' is provided with a groove 44B' in the outer peripheral wall thereof and an O-ring seal 46B' received in groove 44B' for providing a seal between the outer wall of ring 40B' and the port body 32B', as shown in FIG. 10.

In FIG. 11 there is shown how a port of the type shown in FIG. 6, involving a straight thread hole having a tapered counterbore at its outer end is constructed to provide a combination fluid flow port in accordance with the invention. Since the embodiment shown in FIG. 11 is essentially the same as that shown in FIG. 9 corresponding parts have been given the same reference numerals with the letter C used. Male half 10' also includes a flange clamp 20' for securing flanged head 12' in sealing contact with the mating face of a combination port 30C' to which the male half is connected in the forming of a fluid flow connection by means of a standard four bolt connection as discussed above. The port body 32C' provides a mating face 34C' and has a hole 36C' extending inwardly from the mating face 34C'. Hole 36C' has an end hole portion or counterbore 38C' formed at its outermost end adjacent mating face 34C'. The port 30C' includes a relatively thick annular ring 40C' constructed and arranged to fit closely within counterbore 38C', as by a close fit or a press fit. Annular ring 40C' provides a face 42C' aligned with and extending radially inwardly from the mating face 34C' of port body 30C'. The inner diameter of ring 40C' is less than the inner diameter of the groove 18' receiving the O-ring 16' of the cooperating flanged head 12'. The parts are constructed and arranged so that the face 42C' is arranged to cooperate with the flanged head 12 to make the O-ring seal 16' to be held captive, i.e., O-ring 16' is enclosed with a flat face by the mating face 42C' of the ring 40C' of port 30C' in the connected position of the male half 10' and the port 30C', as shown in FIG. 9. The hole 36C' in port body 32C' is provided with the conventional tapered threaded portion 39C' extending inwardly from counterbore 30C', which threaded portion 39C' is adapted to be threadedly engaged with a threaded male half in the alternate use of the combination port 30C' as discussed above. Annular ring 40C' is provided with a groove 44C' in the outer peripheral wall thereof and an O-ring seal 46C' received in groove 44C' for providing a seal between the outer wall of ring 40C' and the port body 32C' as shown in FIG. 11.

There are in use today fluid flow components, such as valves and the like, that are made to be screwed directly into a threaded port. One example of this type of component is the ICT Check Valve with external SAE threads manufactured by Inserta Products, Inc. of Blue Bell, Pa. FIG. 12 illustrates a combination fluid flow port in accordance with the invention of the type shown in FIG. 5 adapted to accept a check valve component of the type manufactured by Inserta Products. As shown in FIG. 12, the combination port 130B is similar to port 30B, the main difference being the construction of the port body 132B and its hole 136B.

In FIG. 12 there is shown a fluid flow connection of the type comprising a male half 10 including a flanged head 12 having a sealing face 14 provided with an O-ring seal 16 received in an annular groove 18 in face 14 and a flange clamp 20 for securing the flanged head 12 in sealing contact with the mating face of the port 130B to which the male half 10 is connected (by a standard four bolt connection) in the forming of a fluid flow connection. The port body 132B provides a mating face 134B and has a hole 136B extending inwardly from the mating face 134B. The hole 136B has an end hole portion or counterbore 138B formed at its outermost end adjacent the mating face 134B of the port body 132B. The port 130B also includes a flat annular ring 140B constructed and arranged to fit closely within the counterbore 138B, as by a close fit or a press fit. The annular ring 140B provides a face 142B aligned with, and extending radially inwardly from, the mating face 134B of the port body 132B. The inner diameter of the ring 140B is less than the inner diameter of the groove 18 receiving the O-ring seal 16 of the cooperating flanged head 12 whereby the O-ring seal 16 is held captive, i.e., it is enclosed with a flat face, by the mating face of the port 130B (provided by faces 134B and 142B) in the connected position of the male half 10 and the port 130B as shown in FIG. 12. The hole 136B in the port body 132B is provided with the conventional straight threaded portion 139B extending inwardly from the counterbore 138B, which threaded portion 139B is adapted to be threadedly engaged with an externally threaded fluid flow component 60, such as an ICT Check Valve manufactured by Inserta Products, Inc. Component 60 is contained in hole 134B and has an O-ring seal 62 which is seated in sealing contact with an annular seat 64 formed in body 132B.

Figure 13:
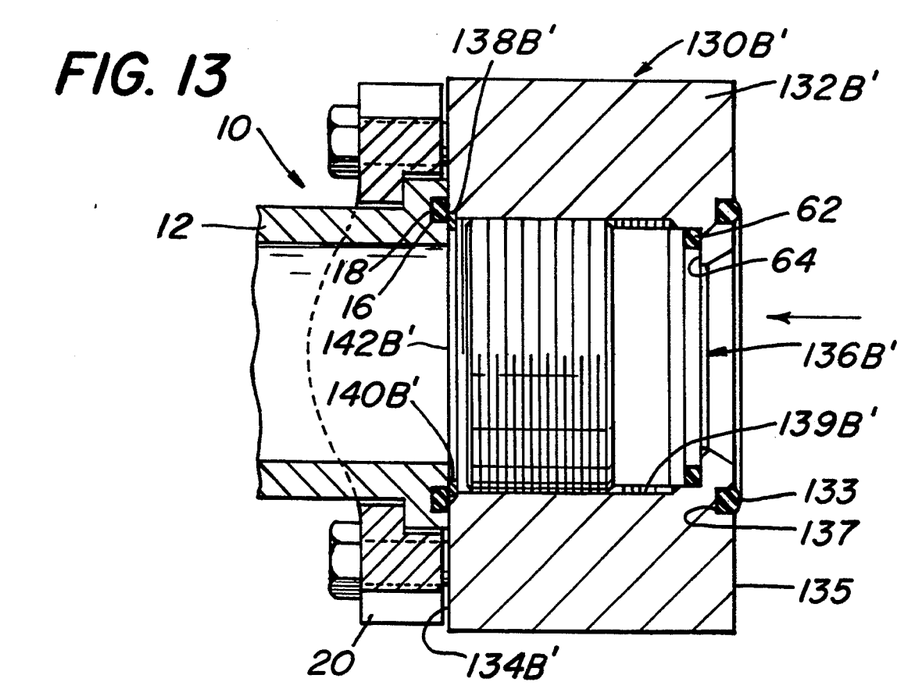
Figure 14:
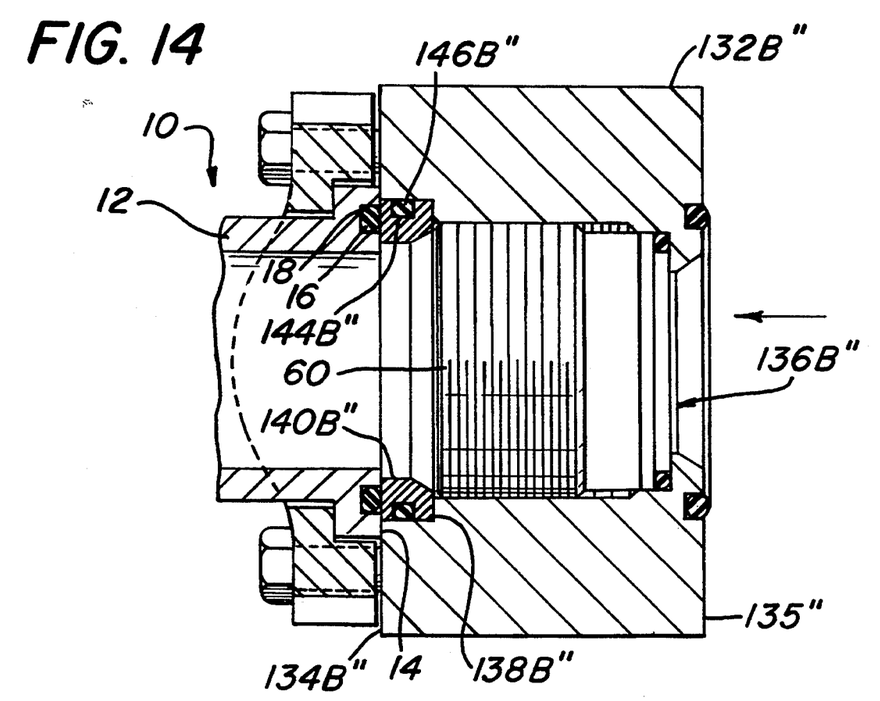

There is also in use today fluid flow components having a slip-in construction that allows the fluid flow component to be sandwiched between a flange port and its flange type male half. An example of this type of component is the ICF Flange Body with an ICS Check Valve manufactured by Inserta Products, Inc. FIG. 13 illustrates how a combination port in accordance with the invention can be adapted to accept a component of this type. This novel construction makes it possible to employ a component that screws into a port in a sandwiched flange body of the slip-in type and apply it in a manner similar to the Inserta Products ICF Flange Body with an ICS Check Valve. Thus, FIG. 13 shows the Inserta Products ICT Check Valve assembled into a threaded port flange body. FIG. 14 shows a similar construction showing that the same results can be achieved by employing the alternate thick ring construction of the type shown in FIG. 10, for example.

The embodiment shown in FIG. 13 is similar to that shown in FIG. 12 except that the port body is provided with a slip-in flange construction. Accordingly, corresponding parts of the embodiment shown in FIG. 13 have been given the same reference numerals with primes added. Thus, port 130B' comprises a port body 132B' made of a slip-in construction whereby said body includes a pair of spaced-apart parallel walls, one of said walls providing a mating face 134B' adapted to mate with the sealing face 14 of male half 10 and the other of said walls providing a second mating face 135 adapted to mate with a flanged port and having an annular groove 137 in said second mating face 135 containing an O-ring seal 133 providing an annular seal extending around the hole 136B' in the port body 132B'. The hole 136B' has a counterbore 138B' formed adjacent mating face 134B'. Port 130B' also includes a flat annular ring 140B' constructed and arranged to fit closely within counterbore 138B'. Annular ring 140B' provides a face 142B' aligned with and extending radially inwardly from mating face 134B' of port body 132B'. Ring 140B' is constructed in a manner similar to ring 140B as described above. Hole 136B' is provided with the conventional straight threaded portion 139B' adapted to be threadedly engaged with an externally threaded fluid flow component 60, which component is contained in hole 136B' and has an O-ring seal 62 which is seated in sealing contact with an annular seat 64 formed in body 132B'.

FIG. 14 shows an embodiment of the invention similar to that shown in FIG. 13 except that a thick ring of the type shown in FIG. 10 is employed instead of the thin ring 140B' employed in the FIG. 13 embodiment. The construction of the embodiment shown in FIG. 14 will be evident from a consideration of FIGS. 13 and 14 and the description thereof. The FIG. 14 embodiment comprises a port body 132B" provided with a slip-in construction whereby said body includes a pair of spaced-apart parallel walls, one of said walls providing a mating face 134B″ adapted to mate with the sealing face 14 of male half 10 and the other of said walls providing a second mating face 135″ adapted to mate with a flanged port. The threaded hole 136B″ in the port body 132B″ is adapted to be threadedly engaged with an externally threaded fluid flow component 60 contained therein as described above with respect to the FIG. 13 embodiment. Also, the port hole 136B″ is provided with a thick annular ring 140B″ for use in mating with sealing face 14 and for containing in a captive condition the O-ring seal 16 of the connected male half 10. Ring 140B″ has a groove 144B″ in the outer peripheral wall thereof and an O-ring seal 146B″ received in groove 144B″ to provide a seal between the outer wall of ring 140B″ and port body 132B″.

Figure 15:
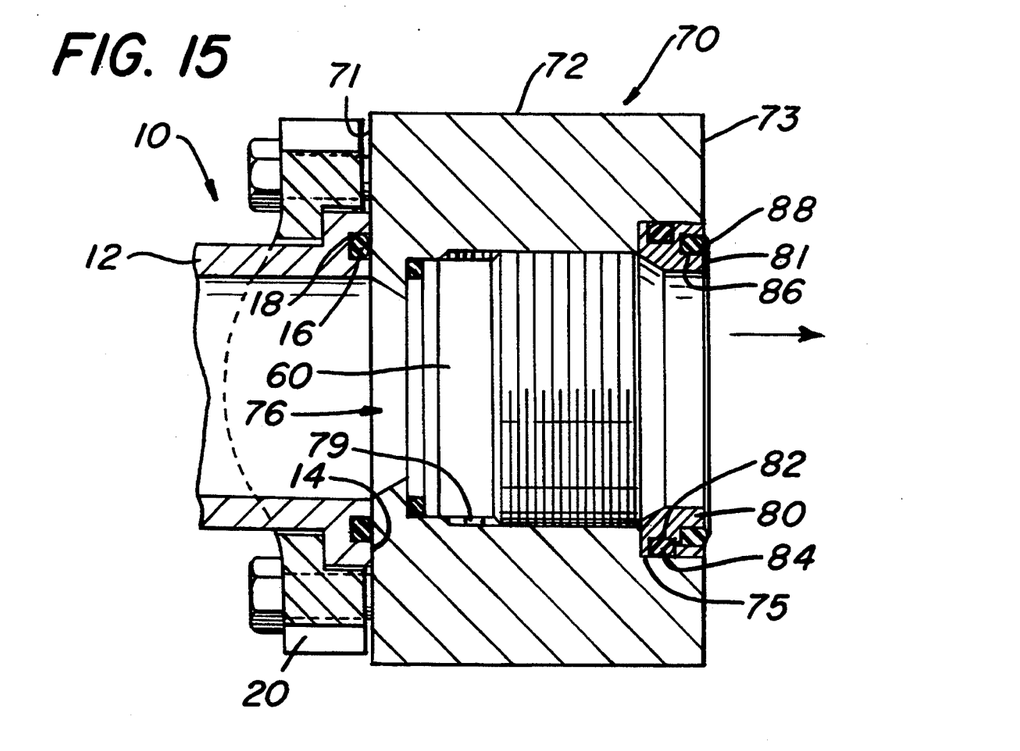

FIG. 15 illustrates how the embodiment of the invention shown in FIG. 14 can be constructed to change the orientation of the fluid flow component 60 in the fluid flow system. Briefly, this is achieved by removing the face seal from the port body and employing a flange face seal ring.

The embodiment of the invention shown in FIG. 15 comprises a port 70 comprising a port body 72 made of a slip-in construction whereby said body has a pair of spaced-apart parallel walls, one of said walls providing a first mating face 71 having an inner diameter less than the diameter of the groove 18 receiving the O-ring seal 16 of the cooperating flanged head 12 of the male half 10 of the fluid flow connection shown in this figure. By this construction, the O-ring seal 16 is held captive by the first mating face 71 of port 70 in the connected position of male half 10 and port 70. The other of said parallel walls provides a second mating face 73 for cooperation with another flanged port connected in the fluid flow system opposite said male half 10 and to permit the port body 72 to be slipped therebetween.

The port body 72 is provided with a hole 76 extending therethrough between the walls providing faces 71 and 73. Hole 76 is provided with an end hole portion or counterbore 75 formed at the outermost end thereof adjacent the second mating face 73 provided by said other wall. Hole 76 is threaded in the portion 79 thereof extending inwardly from counterbore 75. A fluid flow component 60 is received in the port hole 76 in threaded engagement with the threaded portion 79 thereof. An annular ring 80 is constructed and arranged to fit closely within counterbore 75 to provide a front face 81 aligned with and extending radially inwardly from mating face 73. Ring 80 has a groove 82 in the outer peripheral wall thereof and includes an O-ring seal 84 received in groove 82 for providing a seal between ring 80 and the port body 70. Annular ring 80 is provided with a second groove 86 in the front face 81 thereof and includes a second O-ring seal 88 received in second groove 86 for providing a face seal on said second mating face 73 of port body 72 for cooperation with a flanged port with which said slip-in port 70 cooperates.

Figure 16:
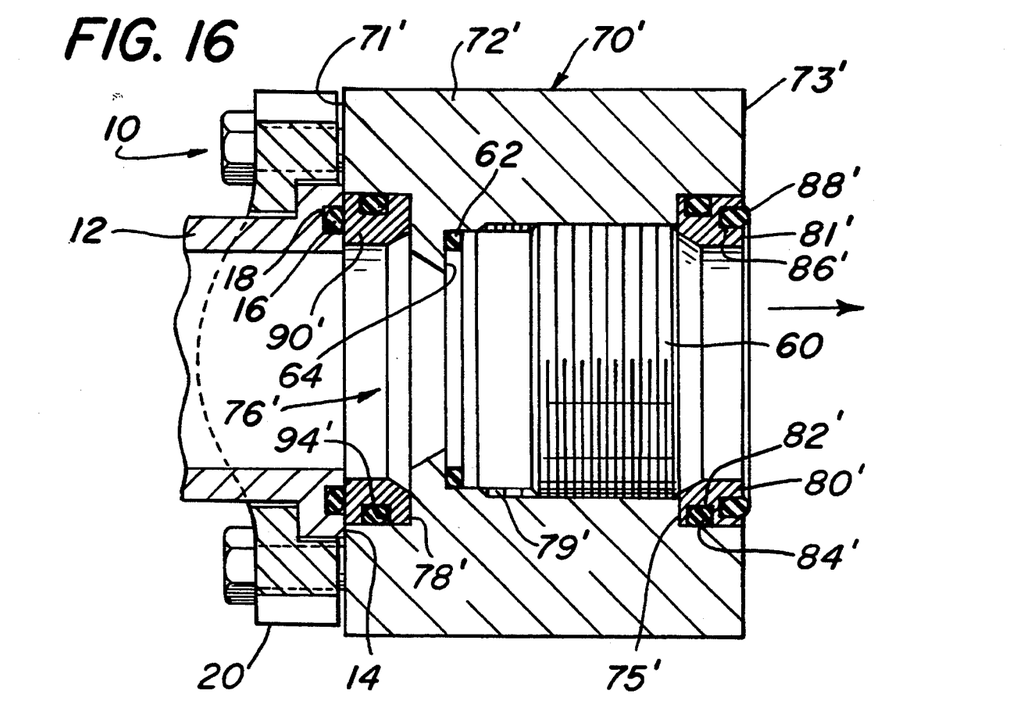

FIG. 16 shows a combination port construction in accordance with the invention similar to that shown in FIGS. 14 and 15 and involving a universal body with two rings whereby the port 70′ is made to be bi-directional, i.e., the flow component contained therein can be oriented to face in either direction. Briefly, this is achieved by making the flange face seal ring and the flange port ring the same size, the port body being machined with counterbores to accomodate both these rings and the arrangement being such that the exchanging of the two rings in the flange body will in effect change the orientation of the flow component in the fluid flow system.

Referring to FIG. 16, there is shown a fluid flow connection of the type having a male half 10 including a flanged head 12 having a sealing face 14 provided with an O-ring seal 16 received in a groove 18 therein and a flange clamp 20 for securing the flanged head 12 in sealing contact with the face of a port to which male half 10 is connected. The port 70 comprises a body 72′ made of a slip-in construction having a pair of spaced-apart parallel walls, one of said walls providing the first mating face 71′ and the other of said walls providing a second mating face 73′ and the other of said walls providing a second mating face 73′. A hole 76′ is provided in port body 72′ to extend therethrough between said walls thereof. The hole 76′ has a first end hole portion or counterbore 78′ formed at the outermost end thereof adjacent the first mating face 71′ and a second end hole portion or counterbore 75′ formed at the outermost end thereof adjacent the second mating face 73′. The hole 76′ in port body 72′ is provided with a conventional straight threaded portion 79′ extending inwardly from the counterbore 75′ adjacent the second mating face 73′, which threaded portion 79′ is adapted to be threadedly engaged with an externally threaded fluid flow component 60 of the type described above. Component 60 is received in the port hole 76′ in threaded engagement with said threaded portion 79′ thereof and has an O-ring seal 62 which is seated in sealing contact with an annular seat 64 formed in the port body 72′.

The embodiment shown in FIG. 16 comprises a first annular ring 90′ constructed and arranged to fit closely within counterbore 78′ and to provide a face aligned with and extending radially inwardly from said first mating face 71′ of port body 72′. The inner diameter of the first annular ring 90′ is less than the inner diameter of the groove 18 receiving the O-ring seal 16 of a cooperating flanged head 12 of male half 10 of the fluid flow connection and the outer diameter of ring 90′ is larger than that of groove 18 whereby said O-ring seal 16 is held captive by a mating face of port 70′ in the connected position of male half 10 and port 70′. Ring 90′ has an O-ring seal 94′ contained in a groove in its outer peripheral wall for sealing with port body 72′. The second annular ring 80′ is constructed and arranged to fit closely within the second counterbore 75′ to provide a front face 81′ aligned with and extending radially inwardly from the second mating face 73′. The second annular ring 80′ has a groove 82′ in the outer peripheral wall thereof and includes an O-ring seal 84′ received in said groove 82′ for providing a seal between the second annular ring 80′ and the port body 72′. The second annular ring 80′ also has a groove 86′ in the front face 81′ thereof, said groove 86′ containing a second O-ring seal 88′ received therein for providing a face seal on said second mating face 73′ of the port body 72′. The first and second counterbores 78′ and 75′ are of the same size. Also, the first and second annular rings 90′ and 80′ are of the same size so as to fit interchangeably within said counterbores 78′ and 75′. Thus, the rings 90′ and 80′ may be interchanged in their position within said first and second counterbores 78′ and 75′ so as to allow for two alternate orientations of the port 70′ in a fluid flow system.

It will be apparent to one skilled in the art of fluid flow systems that the combination port in accordance with the invention offers numerous advantages. An important advantage is the providing of a combination port which is capable of having equal size flange ports and thread ports with world class fluid flow components. Another important advantage of the combination port in accordance with the invention is the ability to change sandwich (or slip-in type) flange valve body ports to reverse a component's orientation.

Another advantage results from the use of the thick annular ring construction employed in the embodiment of the invention shown in FIG. 9, as well as in FIGS. 10, 11, and other figures. Using FIG. 9 as an example, when the fluid flow connection is used in a pressurized system, whereby the fluid containing cavity is pressurized, O-ring 16' seals against the opposing radial face of annular ring 40A' and imparts a force thereon in an axial direction inwardly (i.e., to the right as viewed in FIG. 9) tending to break the seal, i.e., separate O-ring 16' from annular ring 40A'. This inward, seal separating force on annular ring 40A' is proportional not only to the fluid pressure in the cavity, but also to the projected area of annular ring 40A' facing the sealing surface of O-ring 16'. At the same time, O-ring 46A' seals against the outside wall of counterbore 38A' and a force is imparted on the annular ring 40A' in a direction opposite to the force caused by the sealing action of O-ring 16', this outward force urging annular ring 40A' against O-ring 16' and face 14' of flanged head 12'. This outward, seal enhancing force is proportional not only to the fluid pressure in the cavity, but also to the projected area of annular ring facing the face 14' of flanged head 12, which area has a larger outer diameter and pressure responsive area than that of O-ring 16'. Thus, the outward, seal enhancing force is larger than the seal separating force whereby a positive sealing action of O-ring 16' against the opposed radial surface of annular ring 40A' will be enforced when the FIG. 9 construction is used. This also serves to minimize tolerance problems in the manufacture of the flow connection.

It will be apparent that various changes may be made in the construction and arrangement of parts without departing from the scope of the invention, wherefore it is not desired it be limited except as required by the following claims.

What is claimed is:

1. For use in a fluid flow connection of the type having a male half including a flanged head having a sealing face provided with an O-ring received in a groove therein and a flange clamp for securing the flanged head in sealing contact with the mating face of a port to which said male half is connected, the improvement wherein said port comprises a body providng a mating face, a hole in said port body extending inwardly from said mating face of said port body, said hole having an end hole portion formed at the outermost end thereof adjacent said mating face of said port body and being threaded in the portion thereof extending inwardly from said end hole portion, and an annular ring constructed and arranged to fit closely within said end hole portion and to provide a face aligned with and extending radially inwardly from said mating face of said port body, the inner diameter of said ring being less than the inner diameter of the groove receiving the O-ring of the cooperating flanged head of the fluid flow connection whereby said O-ring is held captive by a mating face of said port in the connected position of said male half and said port.

2. For use in a fluid flow connection according to claim 1 wherein said end hole portion has a tapered outer wall, the outer wall of said annular ring having a taper conforming to said taper of said end hole portion.

3. For use in a fluid flow connection according to claim 1 wherein said ring comprises a relatively thin configuration.

4. For use in a fluid flow connection according to claim 1 wherein said ring is provided with a groove in the outer peripheral wall thereof and including an O-ring seal received in said groove for providing a seal between said ring and said port body.

5. For use in a fluid flow connection according to claim 1 and including a fluid flow component contained in said port hole in threaded engagement with said threaded portion thereof.

6. For use in a fluid flow connection according to claim 5 wherein said port body is made of a slip-in construction wherein said body includes a pair of spaced apart parallel walls, one of said pair of walls providing said mating face of said port body, the other of said walls providing a second mating face adapted to mate with a flange port, said second mating face having an annular groove therein and an O-ring seal received in said groove to provide an annular seal extending around said hole.

7. For use in a fluid flow connection according to claim 4 and including a fluid flow component contained in said port hole in threaded engagement with said threaded portion thereof.

8. For use in a fluid flow connection according to claim 6 wherein said port body is made of a slip-in construction wherein said body includes a pair of spaced apart parallel walls, one of said pair of walls providing said mating face of said port body, the other of said walls providing a second mating face adapted to mate with a flange port, said second mating face having an annular groove therein and an O-ring seal received in said groove to provide an annular seal extending around said hole.

9. For use in a fluid flow connection of the type having a male half including a flanged head having a sealing face provided with an O-ring received in a groove therein and a flange clamp for securing the flanged head in sealing contact with the mating face of a port to which said male half is connected, the improvement wherein said port comprises a body made of a slip-in construction having a pair of spaced-apart parallel walls, one of said walls providing a first mating face having an inner diameter less than the diameter of the groove receiving the O-ring of the cooperating flanged head of the male half of the fluid flow connection whereby said O-ring is held captive by said first mating face of said port in the connected position of said male half and said port, the other of said walls providing a second mating face, a hole in said port body extending therethrough between said walls thereof, said hole having an end hole portion formed at the outermost end thereof adjacent said second mating face provided by said second wall, said hole being threaded in the protion thereof extending inwardly from said end hole portion, a fluid flow component received in said port hole in threaded engagement with said threaded portion thereof, an annular ring constructed and arranged to fit closely within said end hole portion to provide a front face aligned with and extending radially inwardly from said mating face of said second wall, said ring having a groove in the outer peripheral wall thereof and including an O-ring seal received in said groove for providing a seal between said ring and said port body, said ring having a groove in said front face thereof and including a second O-ring seal received in said second groove for providing a face seal on said second mating face of said port body.

10. For use in a fluid flow connection of the type having a male half including a flanged head having a sealing face provided with an O-ring received in a groove therein and a flange clamp for securing the flanged head in sealing contact with the mating face of a port to which said male half is connected, the improvement wherein said port comprises a body made of a slip-in construction having a pair of spaced-apart parallel walls, one of said walls providing a first mating face, the other of said walls providing a second mating face, a hole in said port body extending therethrough between said walls thereof, said hole having a first end hole portion formed at the outermost end thereof adjacent said first mating face, said hole having a second end hole portion formed at the outermost end thereof adjacent said second mating face, said hole being threaded in the portion thereof extending inwardly from said second end hole portion, a fluid flow component received in said port hole in threaded engagement with said threaded portion thereof, a first annular ring constructed and arranged to fit closely within said first end hole portion and to provide a face aligned with and extending radially inwardly from said mating face of said port body, the inner diameter of said first annular ring being less than the inner diameter of the groove receiving the O-ring of a cooperating flanged head of the male half of the fluid flow connection whereby said last-mentioned O-ring is held captive by a mating face of said port in the connected position of said male half and said port, a second annular ring constructed and arranged to fit closely within said second end hole portion to provide a front face aligned with and extending radially inwardly from said second mating face, said second annular ring having a groove in the outer peripheral wall thereof and including an O-ring seal received in said groove for providing a seal between said second annular ring and said port body, said second annular ring having a groove in said front face thereof and including a second O-ring seal received in said second groove for providing a face seal on said second mating face of said port body.

11. For use in a fluid flow connection according to claim 10 wherein said first and second end hole portions are of the same size, and wherein said first and second annular rings are of the same size whereby the rings may be interchanged in their position within said first and second end hole portions so as to allow for two alternate orientations of said port in a fluid flow system.

* * * * *